(No Model.)
J. E. SARJENT.
DEVICE FOR UPSETTING TIRES.
No. 251,644. Patented Dec. 27, 1881.
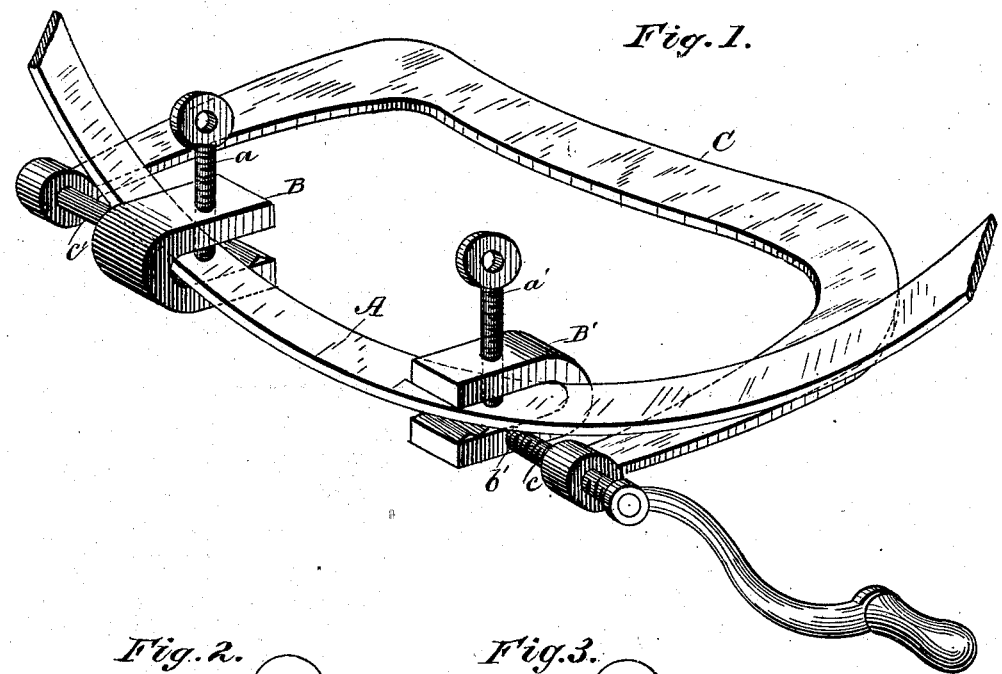
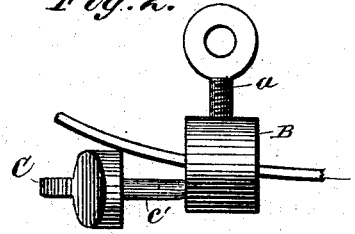 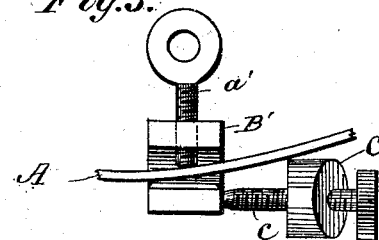
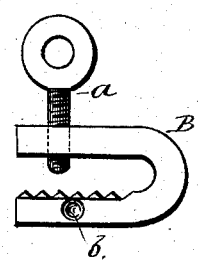 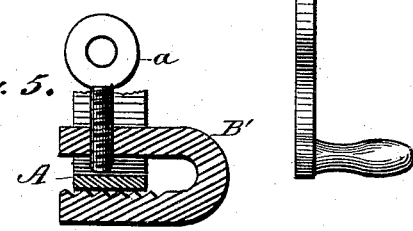
WITNESSES:
Fred G. Dieterich
Edw. W. Byrn.
INVENTOR:
James E. Sarjent
BY
ATTORNEYS.

UNITED STATES PATENT OFFICE.

JAMES E. SARJENT, OF BROWNVILLE, COLORADO.

DEVICE FOR UPSETTING TIRES.

SPECIFICATION forming part of Letters Patent No. 251,644, dated December 27, 1881.

Application filed May 26, 1881. (No model.)

*To all whom it may concern:*

Be it known that I, JAMES ENOCH SARJENT, of Brownville, in the county of Jefferson and State of Colorado, have invented a useful Improvement in Devices for Upsetting Tires; and I do hereby declare that the following is a full, clear, and exact description of the same, reference being had to the accompanying drawings, forming part of this specification, in which—

Figure 1 is a perspective view, showing the device attached to the tire. Figs. 2, 3, 4, and 5 are detail views, showing the construction and arrangement of the two clamps.

The object of my invention is to provide a device for holding, upsetting, and welding tires for vehicle-wheels, where they require to be shortened, which device, while expediting the work by saving time and labor, shall also be of such simple and cheap construction as to put it within the reach of every blacksmith.

It consists of two strong clamps having set-screws, and adapted to be fastened to the tire on each side of the point where it is to be upset or "jumped" together. These clamps are provided with seats that receive the centers or bearings of a large yoke-piece which extends from one of the clamps to the other. One of these centers is a screw provided with a handle, by turning which the one clamp is forced toward the other and the tire held by them is upset, so that it may be rapidly finished with a solid weld.

In the drawings, A represents the tire, and B B' are two U-shaped clamps adapted to receive the tire. One of the inner faces of these clamps is serrated or roughened so as to bite the tire, while set-screws $a\,a'$ are tapped through the outer and opposite sides of the clamps, and made to hold the tire by forcing it against the serrated face. In the edges of these two clamps B B' are formed seats $b\,b'$ for the centers or bearings $c\,c'$ of the yoke-piece C. One of these centers, $c$, is screw-threaded and tapped through one end of the yoke and provided with a handle for turning it.

The yoke-piece C is made sufficiently strong to withstand the strain of upsetting the tire and long enough to extend a suitable distance to each side of the part of the tire to be upset. It is also curved longitudinally to correspond in curvature to the curvature of the tire. Now when a tire is to be shortened by being upset or jumped together without being cut the clamps B B' are fastened to it on each side of the point where the upsetting is to take place, with the seats $b\,b'$ on the outer sides. The centers of the yoke C are then fitted to the seats and tightened by turning the screw $c$. The tire is then put in the fire and heated, and when hot enough it is upset by turning the screw $c$ until the tire is sufficiently shortened, which may be readily ascertained by knowing how many threads of the screw there are to the inch, and when the desired amount is taken up the tire is hammered on the anvil to a solid weld.

By this machine I save from one to three heats and the labor of an extra man, and also do the work in a very much shorter time.

What I claim is—

The combination, with the tire-clamps B B', having set-screws and seats $b\,b'$, of the yoke C, having two bearings, one of which is formed upon an adjustable screw for forcing together the smaller clamps, substantially as shown and described.

JAMES ENOCH SARJENT.

Witnesses:
A. W. RUGG,
C. NUCKOLLS.